April 9, 1968

L. H. CROSS ETAL  3,376,731
APPARATUS FOR COLLECTING FRACTIONS SEPARATED
BY GAS-CHROMATOGRAPHY

Filed Jan. 29, 1964

INVENTORS
LEONARD HERBERT CROSS
SAMUEL INGLEFIELD
By NORMAN WARD
Cushman, Darby & Cushman
ATTORNEYS April 9, 1968     L. H. CROSS ETAL     3,376,731
APPARATUS FOR COLLECTING FRACTIONS SEPARATED
BY GAS-CHROMATOGRAPHY
Filed Jan. 29, 1964     4 Sheets-Sheet 2

INVENTORS
LEONARD HERBERT CROSS
SAMUEL INGLEFIELD
NORMAN WARD

By
Cushman, Darby & Cushman
ATTORNEYS

INVENTORS
LEONARD HERBERT CROSS
SAMUEL INGLEFIELD
NORMAN WARD
By Cushman, Darby & Cushman
ATTORNEYS April 9, 1968 L. H. CROSS ETAL 3,376,731
APPARATUS FOR COLLECTING FRACTIONS SEPARATED
BY GAS-CHROMATOGRAPHY
Filed Jan. 29, 1964 4 Sheets-Sheet 4

INVENTORS
LEONARD HERBERT CROSS
SAMUEL INGLEFIELD
NORMAN WARD

BY
Cushman, Darby Cushman
ATTORNEYS

United States Patent Office 3,376,731
Patented Apr. 9, 1968

3,376,731
APPARATUS FOR COLLECTING FRACTIONS
SEPARATED BY GAS-CHROMATOGRAPHY
Leonard Herbert Cross and Samuel Inglefield, Winnington, Northwich, and Norman Ward, Davenham, Northwich, England, assignors to Imperial Chemical Industries Limited, London, England, a corporation of Great Britain
Filed Jan. 29, 1964, Ser. No. 340,874
Claims priority, application Great Britain, Jan. 29, 1963, 3,627/63
1 Claim. (Cl. 73—23.1)

ABSTRACT OF THE DISCLOSURE

An improved apparatus for collecting, detecting and recording fractions from a gas chromatography column is provided with two time-delay circuits that prevent the recorder from wrongly actuating valve driving means in response to spurious peaks on a chromatogram which is being delineated by the recorder apparatus.

This invention relates to an apparatus suitable for attaching to gas-chromatography systems for the purpose of collecting pure samples of liquids separated by such systems.

In the analysis of small quantities of materials microtechniques and other methods such as the measurement of infra-red absorption spectra are often used, but it is important to provide the analyst with samples as pure as possible. Fractional distillation can usually bring about a useful degree of separation of one substance from another, but where particularly pure samples are required, for example in the identification of new compounds, it is often convenient to employ gas-chromatography to obtain them.

The object of the invention is to provide an automatic apparatus which when attached to a gas-chromatographic separation column can collect substantially pure fractions as they issue from the column, can work continuously without attention and can when required inject into the gas-chromatographic system further portions of material for separation thereby.

One could design an automatic collecting apparatus that would inject portions of material and collect separated fractions at fixed time intervals, but with such a method elution times of fractions, which can vary for one reason and another, could cause mistiming of the collector mechanism and result in fractions not being pure. A better way would be to control the collecting mechanism, not by a time factor but by using some physical property of the fraction itself to give a signal translatable into mechanical effort that could actuate the collecting mechanism. The apparatus of the invention is based on this principle with the result that variations in elution times have no effect on its performance.

According to our invention we provide an apparatus for collecting the fractions issuing from a gas-chromatography column comprising a detector arranged for connection to the discharge end of the column and through which the emerging fractions pass, each in turn causing the detector to give an electrical signal proportional to the concentration of the fraction; a recorder into which the electrical signals are fed and which delineates the chromatogram; a two-position switch actuated by said recorder at any desired level, rising or falling, on the chromatogram; an electric motor able to be started or stopped by said switch in either position and driving by means of a multi-station stop-dwell-go mechanism a rotary valve assembly having an upper stationary member with an inlet port leading to an inlet pipe communicating with the discharge end of the detector, and a lower rotating member having a plurality of exit ports leading to exit pipes, said ports arranged to register one at a time and in turn with the port on said stationary member; a second two-position switch able to start or stop the motor in either position and actuated by a cam or equivalent means on the drive from motor to stop-dwell-go mechanism, the two switches being so phased in operation sequence and electrically connected that at a chosen level on the rising slope of a chromatogram peak the first starts the motor to drive the stop-dwell-go mechanism and hence rotate the valve until an exit port comes into register with the inlet port and dwells there whereupon the second stops the motor thus containing the dwell period until at a chosen level on the falling side of said chromatogram peak the first restarts the motor to drive the stop-dwell-go mechanism and rotate the valve until said exit port is out of register with the inlet port and the next exit port comes into register, and governed in this way by chosen chromatogram levels the sequence of operation repeats.

A convenient type of detector is one working on the principle of a thermal-conductivity bridge, in which the carrier gas passes through the reference side of the bridge system and carrier gas plus fraction passes through the measuring side. The pressure in the reference side will thus be slightly higher than that in the measuring side, and since this type of detector is pressure-sensitive the recorder would be deflected, but this can easily be corrected by means of a suitable rheostat in the bridge circuit.

The electrical signal from the detector is fed into a servo-operated recorder having an arm fitted to its potentiometer spindle in order to operate the first two-position switch by means of a mechanism of small inertia, for example a light toggle switch.

The multi-station stop-dwell-go mechanism is of the type that can rotate a member, in the present invention the rotating part of the rotary valve, from any one of a plurality of defined positions to the next adjacent position and can dwell at any position for any length of time. A convenient type for the present invention is that known in the art as a Geneva mechanism. This is defined as including a driven member comprising a wheel having a plurality of radial parallel-sided slots, open at their outer ends on the rim of the wheel, and a driving member carrying a roller that engages one of these slots each time the driving member makes a revolution, and thus turns the wheel through a fraction of a complete revolution, the size of the fraction depending on the angular distance between adjacent slots. The rim of the wheel is in the form of a plurality of concave surfaces connecting the open ends of the slots. The driving member also carries a concentric boss or cam, whose surface engages the concave surface between the open ends of a pair of adjacent slots before the roller disengages from one slot of the pair, and prevents the wheel from rotating during the period in which the roller leaves the one slot and moves round to enter the other.

The rotating lower member of the rotary valve may have any convenient number of ports each of which corresponds to one station of the stop-dwell-go mechanism. To obtain pure fractions it is advantageous, after a port has been in register with the inlet port in the stationary upper part of the valve, and a desired fraction has been collected thereby, to arrange that the next port to come into register as the member rotates collects the tailings of that fraction, and then the next port to come into register after that is ready to collect the next fraction without the latter being contaminated by the tailings of the fraction before it. If desired, any or all ports that collect tailings can be joined by a channel arranged to discharge through a common exit port.

In order that further portions of material requiring chromatographic separation can be injected into the column when the previous portion has passed through and has been separated into fractions, it is convenient to arrange that on arriving at its final station the stop-dwell-go mechanism actuates a switch that sets in motion for a given period a motor driving a pump able to inject further portions.

The drive to the pump can, by means of a cam or other device actuating a further switch, be arranged to stop the pump motor after a desired time. By means of suitable relays this pump-operating cycle can be made to occur once in every complete revolution of the rotary valve and in this way the apparatus can be left to collect fractions and inject portions without attention.

Spurious signals can occur in gas-chromatographic apparatus. Those due to electrical disturbances can be avoided by careful design of electronic circuits involved, but those due to pressure changes within the column and detector unit are inherent. It is necessary therefore to find some way of preventing the recorder from actuating the stop-dwell-go mechanism when recording spurious peaks on the chromatogram. Such spurious signals are likely to occur when injection of material into the chromatographic column or movement of the rotary valve from one station to another causes pressure changes. The latter are oscillatory and last for only a few seconds. It is possible to eliminate their effects by means of time-delay circuits. On the rising side of a chromatogram peak a time-delay circuit comes into operation at the moment that the stop-dwell-go mechanism begins to move and applies by means of a relay an additional potential to the recorder causing it to deflect to full scale for a few seconds after which it moves down scale to delineate a normal chromatogram. On the falling side of the chromatogram peak a second time-delay circuit comes into operation at the moment the stop-dwell-go mechanism begins again to move and by means of a relay short-circuits the recorder which immediately moves to zero scale, remains there for a few seconds and then reverts to normal working.

The effects of spurious signals due to pressure changes caused by injection of material into the chromatographic column can be overcome in a similar manner by having a time-delay circuit connected in the switching system for the motor driving the injection pump. This time-delay circuit short-circuits the recorder, and the delay can be several minutes long since it only needs to be less than the retention time in the column.

Further details of the invention will be discussed with reference to the accompanying drawings in which.

Figure 1:
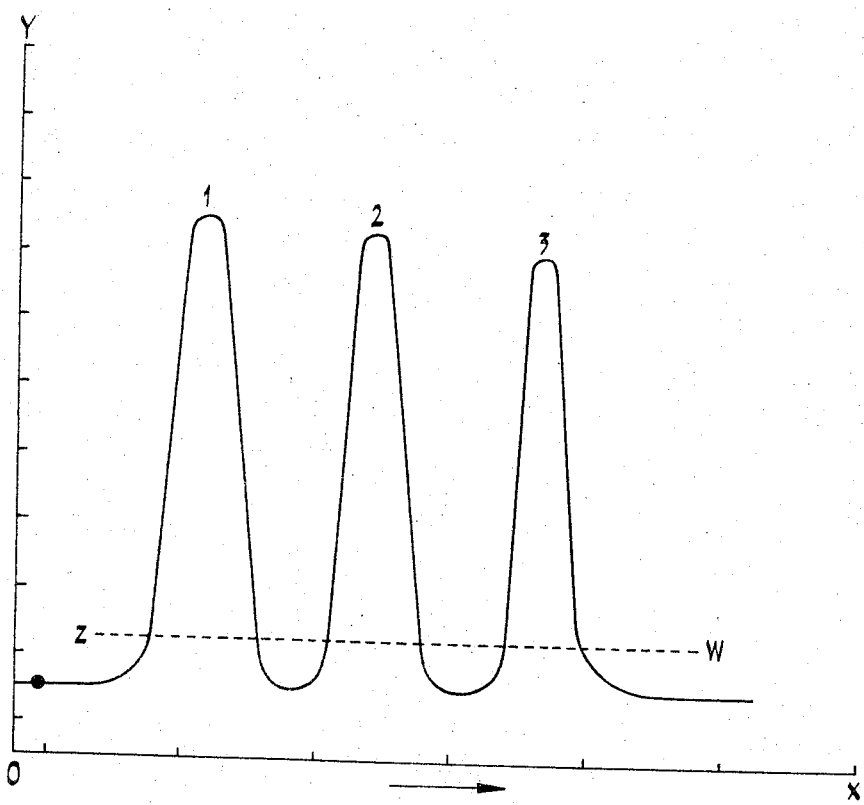
FIGURE 1 represents a typical chromatogram.

In the drawings, FIGURE 1 shows a typical chromatogram. Axis OX represents time and OY concentration. The dotted line ZW is meant to indicate the concentration level at which the operator desires the detector and recorder to set in motion the sequence of events resulting in a fraction being collected. Peaks corresponding to successive fractions are represented by 1, 2 and 3.

Figure 2:
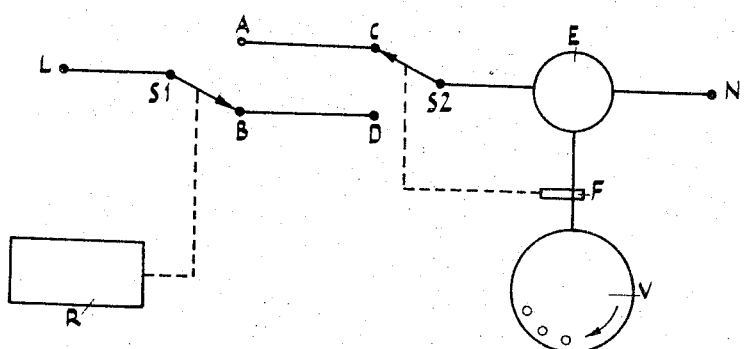
FIGURE 2 illustrates an arrangement of two two-position switches for controlling a motor of a stop-dwell-go mechanism.

FIGURE 2 shows a convenient arrangement of the two two-position switches by means of which the motor driving the stop-dwell-go mechanism is controlled. Switch S1 is set to operate at the chosen chromatogram level represented by ZW in FIGURE 1. Some time after the material to be separated has been injected into the gas-chromatography system the first fraction is eluted, and on passing through the detector causes the recorder, R, to begin to delineate the rising side of the chromatogram peak. At the said level ZW the recorder causes switch S1 to move from position B to position A. Switch S2 at this stage is in position C and the circuit energising motor E is completed whereby the motor drives the stop-dwell-go mechanism which in turn moves the rotary valve V, to the first collecting station. After the valve has been thus positioned the motor drives the mechanism for a further fraction of a revolution of the latter, and during this period switch S2 is made by cam F to move to position D and thereby stop the motor. The motor and mechanism remain stationary all the time the first fraction is being collected until the recorder reaches the level ZW on the falling side of the chromatogram peak whereupon it causes switch S1 to move from position A to position B. Since switch S2 is at this moment in position D the motor circuit is completed again, and the valve is moved on to the next station after which the drive continues as before until cam F moves switch S2 from position D to position C to stop the motor, and keep it stationary all the time the tailings of the first fraction are being collected. At level ZN on the rising side of the second chromatogram peak the cycle of switching operation repeats, the collection of tailings of the first fraction ceases and collection of the second fraction proper begins. In the drawing L and N stand for "line" and "neutral" in the conventional electrical terminology.

Figure 3:
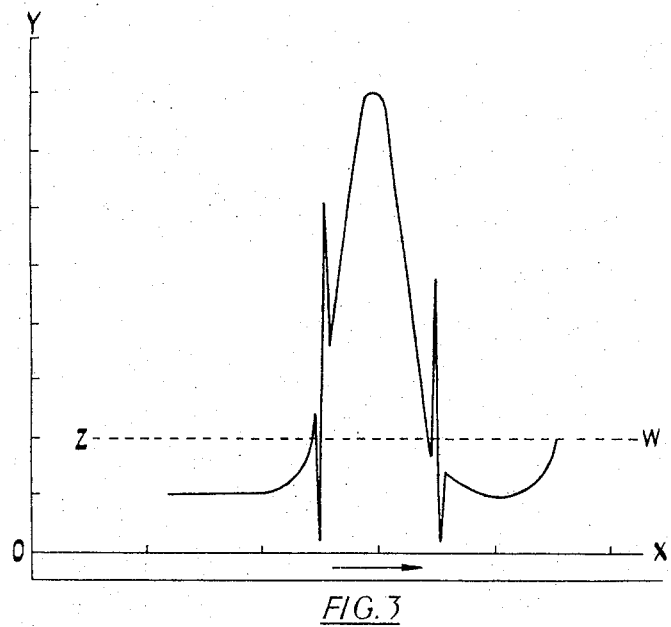
FIGURE 3 represents an example of a chromatogram which would be delineated by a detector-recorder system if spurious signals were allowed to interfere.

FIGURE 3 shows an example of the kind of chromatogram that would be delineated by the detector-recorder system if spurious signals were allowed to interfere. If the detector-recorder system were set to come into action at concentration level ZW, both rising and falling, it can be seen from the chromatogram that the first spurious peak on the rising side would cause the stop-dwell-go mechanism to move the valve two stations beyond the desired one, and similarly on the falling side.

Figure 4:
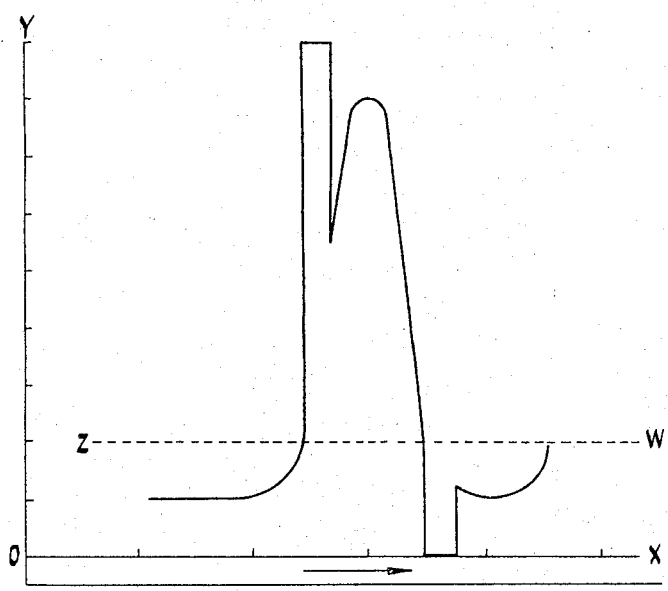
FIGURE 4 illustrates the effect of a time-delay circuit on a chromatogram.

FIGURE 4 shows the effect the time-delay circuits have on a chromatogram and how they make sure that level ZW is crossed only once on the rising side and once on the falling side of the chromatogram peak proper, and how consequently the valve is moved on by only one station on each side as desired.

In both FIGURES 3 and 4 axis OX represents time and OY concentration.

Figure 5:
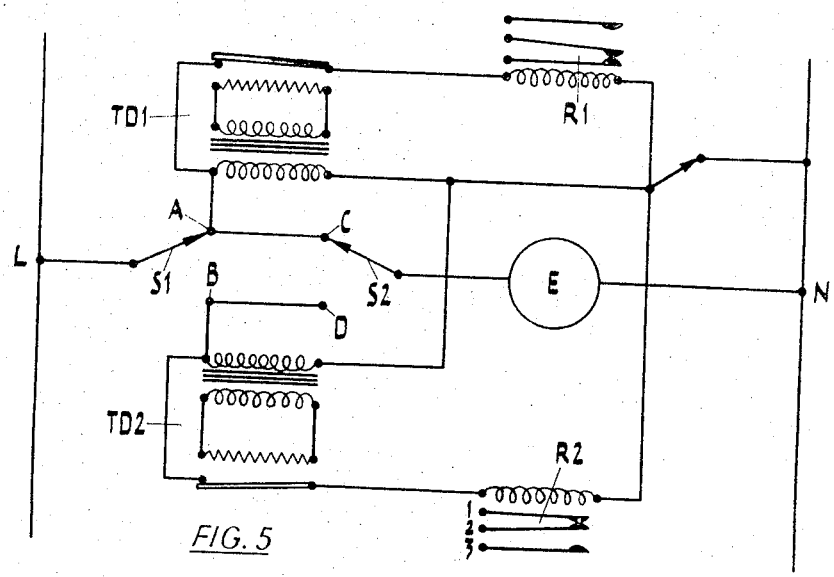
FIGURE 5 illustrates circuitry for a time-delay system applied to the rising side of a chromatogram peak.
Figure 6:
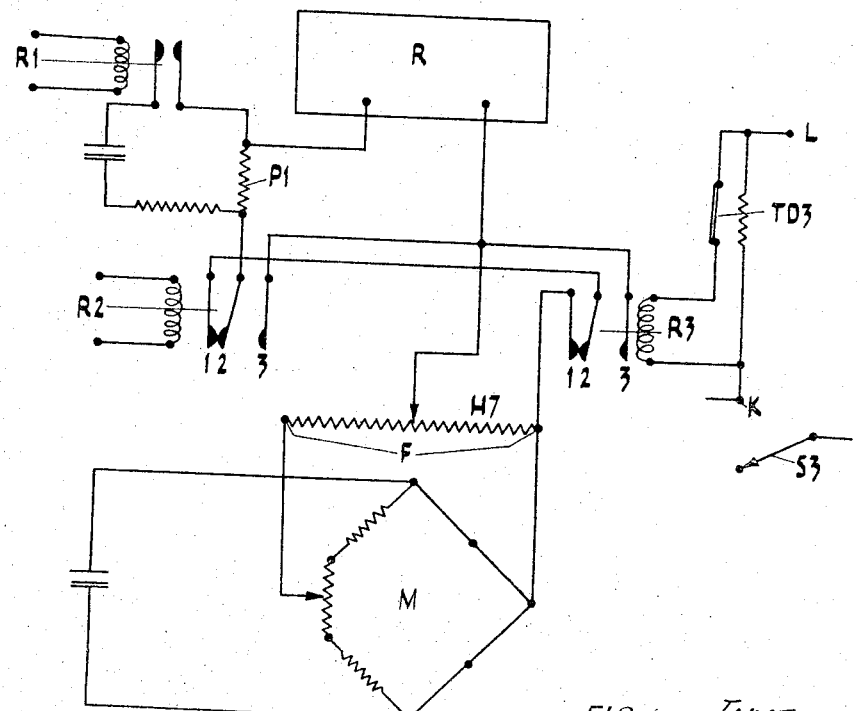
FIGURE 6 illustrates additional circuitry for operating the apparatus of this invention.

FIGURE 5 shows in outline the circuitry of a time-delay system applied to the rising side of the chromatogram peak, and FIGURE 6 shows the relation of this system to the detector-bridge and recorder. In FIGURE 5 the symbols S1, S2, A, B, C, D, E, L and N have the same meaning as they have in FIGURE 2. At level ZW on the rising side of a peak when switch S1 moves to position A a thermal time-delay device TD1 comes into operation and applies an additional potential, represented by P1 in FIGURE 6, to the recorder R, by means of the relay R1 to deflect it to full scale. After a few seconds, when pressure disturbance in the detector has subsided, TD1 operates again and the recorder moves down the scale to delineate the normal chromatogram. At level ZW on the falling side of the peak switch S1 moves to position B and sets in operation a second time-delay device TD2, which via relay R2 short-circuits the recorder. The latter immediately moves to scale-zero where it stays for a few seconds until TD2 operates again and so restores it to normal working.

In FIGURE 6 the switch energising the motor that drives the pump for injecting material into the gas-chromatography system is shown by S3, and the arrival of the rotary valve at its last station causes S3 to move to position K. A third time-delay device TD3, is thereupon energised and operates relay R3 to short-circuit the recorder and keep it out of action whilst injection continues. Direct shorting of the recorder R would cut out section H of the attenuator F of the detector-bridge M, and cause a temporary unbalance of the bridge. This can be prevented by contacts 1 and 2 of relays R2 and R3 which break the attenuator connection just before the recorder is short-circuited.

Figure 7:
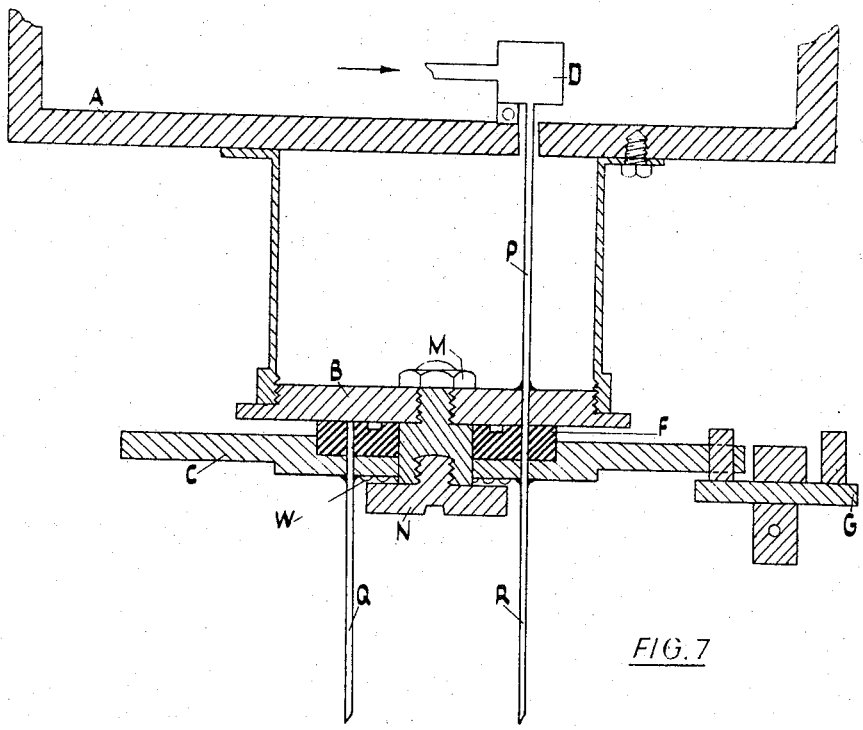
FIGURE 7 illustrates the relationships of various parts of the apparatus of this invention.

FIGURE 7 shows the interrelation of various parts of the apparatus. A represents the base of the chromatographic unit and D the detector through which the fractions pass. P is a narrow pipe, for example of stainless steel and of internal diameter about 0.025 inch, and about 4 inches long, whose function is to deliver the fractions into the port in the upper fixed member B of the rotating valve. The lower rotating member C of the valve carries a plurality of similar pipes, one to each port; their function is to receive fractions from P and convey them to suitable storage containers. Two of these lower pipes are shown by Q and R of which R is shown in register with P. The stop-dwell-go mechanism is represented by G and is shown engaged with rotating valve member C. Between fixed and rotating members B and C is shown a gasket F which fits neatly in a housing in member C, and rotates with it and is preferably made of material having a low coefficient of friction. The pipes attached to member C project into gasket F and their upper ends terminate flush with its surface. Members B and C are held together free from leaks by means of the nut, bolt and washer assembly N, M and W.

Figure 8:
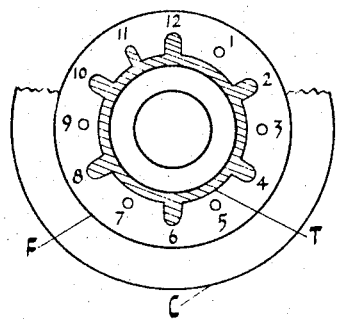
FIGURE 8 is a plan view of a portion of the apparatus of FIGURE 7.

FIGURE 8 shows in plan how gasket F appears in its seating in member C. Various arrangements of ports and pipes are possible; the drawing shows one example in which member C can dwell at 12 stations, and has six ports and pipes corresponding to stations 1, 3, 5, 7, 9 and 11. Of these ports numbers 1, 3, 5, 7 and 9 are for collecting fractions. At stations 2, 4, 6, 8 and 10, and also 12 if necessary, tailings are collected and by means of a channel T in the gasket F are combined and collected at station 11 through the port there. Arrival of member C at station 12 causes further material to be injected into the gas-chromatography system.

What we claim is:

1. Apparatus for collecting fractions from a gas-chromatography column comprising:
    a detector connected at the discharge end of said column for receiving emerging fractions from the column and for producing an electrical signal proportional to the concentration of a fraction;
    a recorder which is connected to said detector for receiving electrical signals therefrom and for delineating a chromatogram;
    a two-position switch connected to said recorder and to an actuating valve-driving means, said two-position switch means being actuated by said recorder at any desired level on the chromatogram so as to operate a valve means which collects fractions from the column;
    first and second time-delay circuits for preventing pressure fluctuations within the apparatus from being recorded as spurious peaks on the chromatogram and from consequently wrongly actuating said valve-driving means,
    the first of said time-delay circuits being operated by a first position of said two-position switch on the rising side of a chromatogram peak, said first time-delay circuit including means for applying an additional potential to the recorder for a short time at the instant the recorder actuates the valve-driving means, said potential being sufficient to deflect the recorder to full-scale for a few seconds, after which the recorder reverts to normal operation,
    the second of said time-delay circuits being operated by a second position of said two-position switch on the falling side of said chromatogram peak, said second time-delay circuit including means for short-circuiting the recorder at the instant the recorder again actuates the valve-driving means so that the recorder deflects to zero scale for a few seconds and then reverts to normal working.

References Cited

UNITED STATES PATENTS 3,245,269 4/1966 Ivie _____ 73—23.1 X
3,301,040 1/1967 Levy et al. _____ 73—23.1

FOREIGN PATENTS 818,703 8/1959 Great Britain.

RICHARD C. QUEISSER, *Primary Examiner.*

C. A. RUEHL, *Assistant Examiner.*